(12) United States Patent
Choi et al.

(10) Patent No.: US 10,257,508 B2
(45) Date of Patent: Apr. 9, 2019

(54) LIGHT SOURCE DEVICE, DISPLAY APPARATUS INCLUDING THE SAME, DISPLAY METHOD USING THE SAME

(71) Applicant: Samsung Electronics Co., Ltd., Suwon-si, Gyeonggi-do (KR)

(72) Inventors: Yoonsun Choi, Yongin-si (KR); Jinho Lee, Suwon-si (KR); Dong Kyung Nam, Yongin-si (KR); Kyuhwan Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 130 days.

(21) Appl. No.: 15/138,759

(22) Filed: Apr. 26, 2016

(65) Prior Publication Data

US 2017/0085869 A1   Mar. 23, 2017

(30) Foreign Application Priority Data

Sep. 23, 2015   (KR) .................. 10-2015-0134528

(51) Int. Cl.
*H04N 7/18*       (2006.01)
*H04N 13/398*     (2018.01)
(Continued)

(52) U.S. Cl.
CPC ......... *H04N 13/398* (2018.05); *G02B 6/0058* (2013.01); *G02B 6/0078* (2013.01); *G02B 27/225* (2013.01); *G02B 27/2214* (2013.01); *H04N 13/32* (2018.05); *H04N 13/368* (2018.05); *G02B 6/0036* (2013.01); *G02B 6/0053* (2013.01); *G02B 6/0068* (2013.01);
(Continued)

(58) Field of Classification Search
CPC .................................. H04N 13/0497
USPC ........................................... 348/54
See application file for complete search history.

(56) References Cited

U.S. PATENT DOCUMENTS 5,796,450 A * 8/1998 Kanda .................. F21V 7/00
                                                  349/64
6,313,867 B1 * 11/2001 Shimakawa ....... G02B 27/2235
                                                  348/51
(Continued)

FOREIGN PATENT DOCUMENTS

CN   203286399 U   11/2013
CN   104460115 A   3/2015
(Continued)

OTHER PUBLICATIONS

Extended European Search Report dated Jan. 2, 2017 issued in corresponding European Patent Application No. 16190477.6.
(Continued)

*Primary Examiner* — Leron Beck
(74) *Attorney, Agent, or Firm* — Harness, Dickey & Pierce, P.L.C.

(57) ABSTRACT

A light source device may include a first light source, a second light source, a light guide plate (LGP) configured to guide a light incident from at least one of the first light source and the second light source, an optical film configured to form a distribution of directional light by controlling a progress path of a light output from the LGP, and a controller configured to control activation of at least one of the first light source and the second light source in order to control the distribution of directional light.

30 Claims, 10 Drawing Sheets

(51) Int. Cl.
*G02B 27/22* (2018.01)
*F21V 8/00* (2006.01)
*H04N 13/32* (2018.01)
*H04N 13/368* (2018.01)
*G02F 1/1335* (2006.01)

(52) U.S. Cl.
CPC .... *G02B 27/2264* (2013.01); *G02F 1/133615* (2013.01); *H04N 2213/001* (2013.01)

(56) References Cited

U.S. PATENT DOCUMENTS

| | | | |
|---|---|---|---|
| 7,450,188 B2 | 11/2008 | Schwerdtner | |
| 8,358,335 B2 | 1/2013 | de la Barre et al. | |
| 8,531,625 B2* | 9/2013 | Sohn | G02B 6/0036 349/61 |
| 8,820,997 B2* | 9/2014 | Minami | G02B 27/2214 362/602 |
| 9,285,597 B2* | 3/2016 | Minami | G02B 6/0043 |
| 9,507,158 B2* | 11/2016 | Shikii | G02B 27/2214 |
| 9,784,902 B2* | 10/2017 | Johnson | G02B 6/0053 |
| 2009/0040426 A1 | 2/2009 | Mather et al. | |
| 2010/0271684 A1* | 10/2010 | Woodgate | F21V 14/003 359/256 |
| 2011/0103036 A1* | 5/2011 | Bosl | G02B 5/3033 362/19 |
| 2011/0170184 A1* | 7/2011 | Wolk | G02B 27/2214 359/463 |
| 2011/0255303 A1* | 10/2011 | Nichol | G02B 6/006 362/606 |
| 2012/0004919 A1* | 1/2012 | Muth | H04N 13/0438 704/500 |
| 2012/0013651 A1 | 1/2012 | Trayner et al. | |
| 2012/0105767 A1* | 5/2012 | Choi | G02B 6/0038 349/62 |
| 2012/0235891 A1* | 9/2012 | Nishitani | G02B 3/0056 345/102 |
| 2012/0236403 A1 | 9/2012 | Sykora et al. | |
| 2012/0274556 A1* | 11/2012 | Sugiyama | G02B 27/2214 345/156 |
| 2012/0299985 A1 | 11/2012 | Ichihashi et al. | |
| 2013/0107517 A1* | 5/2013 | Shih | F21V 3/00 362/235 |
| 2015/0049176 A1* | 2/2015 | Hinnen | H04N 13/007 348/59 |
| 2015/0124185 A1* | 5/2015 | Lin | G02B 27/2214 349/15 |

FOREIGN PATENT DOCUMENTS

| | | |
|---|---|---|
| JP | 3583936 B2 | 11/2004 |
| JP | 2012138222 A | 7/2012 |
| JP | 2014035448 A | 2/2014 |
| JP | 2014112147 A | 6/2014 |
| KR | 10-1096765 B1 | 1/2012 |
| KR | 10-2014-0039357 A | 4/2014 |
| WO | WO-2008045681 A1 | 4/2008 |

OTHER PUBLICATIONS

Office Action for corresponding European Application No. 16190477.6 dated Jul. 20, 2018.

* cited by examiner

LIGHT SOURCE DEVICE, DISPLAY APPARATUS INCLUDING THE SAME, DISPLAY METHOD USING THE SAME

CROSS-REFERENCE TO RELATED APPLICATION

This application claims under 35 U.S.C. § 119 to Korean Patent Application No. 10-2015-0134528, filed on Sep. 23, 2015, in the Korean Intellectual Property Office, the entire contents of which are incorporated herein by reference in its entirety.

BACKGROUND

1. Field

At least one example embodiment relates to a light source device, a display apparatus including the same, and/or a display method using the same.

2. Description of the Related Art

Technology for providing an autostereoscopic three-dimensional (3D) display using a flat panel display (FPD) is known for using an optical plate to divide viewpoints on a front surface of the FPD. For example, the optical plate may include a lenticular lens and a parallax barrier.

A method of using a lenticular lens may divide a left-eye image and a right-eye image by arranging cylinder lenses having small pitches on a front surface of a two-dimensional (2D) FPD. A method of using a parallax barrier may divide a left-eye image and a right-eye image by disposing, on a front surface of an FPD, a barrier to limit a progress direction of light. In a general structure of the parallax barrier, a shield portion to shield an image light output from a 2D display panel and a slit portion, for example, an opening portion, to transmit an image light may be alternately arranged. When a viewer views a display device at a predetermined position and in a predetermined direction, different viewpoint images may be transferred to a right eye and a left eye of the viewer, respectively. Accordingly, through the slit portion, the viewer may sense a 3D effect according to a difference in viewpoints.

SUMMARY

At least one example embodiment relates to a light source device.

According to an example embodiment, a light source device includes a first light source, a second light source, a light guide plate (LGP) configured to guide light incident from at least one of the first light source and the second light source, an optical film configured to form a distribution of directional light by controlling a progress path of light output from the LGP, and a controller configured to control activation of at least one of the first light source and the second light source in order to control the distribution of directional light.

Example embodiments provide that the controller may be configured to activate the first light source and deactivate the second light source to form a distribution of first directional light, and deactivate the first light source and activate the second light source to form a distribution of second directional light.

Example embodiments provide that the controller may be configured to activate the first light source and the second light source to form a distribution of third directional light.

Example embodiments provide that the controller may be configured to alternately activate the first light source and the second light source to alternately form the distribution of first directional light and the distribution of second directional light.

Example embodiments provide that, in the LGP, an area relatively close to the first light source may have a lower density optical pattern than an area relatively far from the first light source.

At least one example embodiment relates to a light source device.

According to another example embodiment, a light source device includes a first light source, a second light source, a light guide plate (LGP) configured to form a light distribution of a line-type light pattern based on a light incident from at least one of the first light source and the second light source, and a controller configured to control a directivity of the line-type light pattern by controlling whether at least one of the first light source and the second light source is activated.

Example embodiments provide that, in the LGP, optical patterns to emit light incident to the LGP to an area outside of the LGP by reflecting or scattering the light may be arranged, and intervals between the optical patterns arranged in the LGP may be identical.

At least one example embodiment relates to a display device.

According to still another example embodiment, a display device includes a camera configured to detect a viewer, a light source device configured to form a distribution of directional light, a display panel configured to output an image based on the distribution of directional light, and a controller configured to selectively activate light sources comprised in the light source device based on a position of the viewer.

Example embodiments provide that the light source device may include a first light source, a second light source, a light guide plate (LGP) configured to guide light incident from at least one of the first light source and the second light source, and an optical film configured to form the distribution of directional light by controlling a progress path of light output from the LGP.

Example embodiments provide that, in the LGP, a first optical pattern array configured to output light incident from the first light source in a first direction and a second optical pattern array to output light incident from the second light source in a second direction may be alternately arranged.

Example embodiments provide that the light source device may include a first light source, a second light source, and an LGP configured to form a light distribution of a line-type light pattern based on light incident from at least one of the first light source and the second light source, and the controller may be configured to control a directivity of the line-type light pattern.

At least one example embodiment relates to a display method.

According to a further example embodiment, a device method includes detecting viewers using a camera, forming a distribution of first directional light toward a first viewer among the viewers, outputting a 3D image based on the distribution of first directional light, forming a distribution of second directional light toward a second viewer among the viewers, and outputting a 3D image based on the distribution of second directional light.

Example embodiments provide that the forming of the distribution of first directional light may include activating a light source arranged at one side of a light guide plate (LGP) comprised in a light source device and deactivating a light source arranged at another side of the LGP.

Example embodiments provide that the forming of the distribution of second directional light may include deactivating a light source arranged at one side of an LGP comprised in a light source device and activating a light source arranged at another side of the LGP.

At least one example embodiment relates to a device including a processor, and a memory including computer readable instructions, which when executed by the processor, cause the processor to determine, from a captured image, a number of viewers and associated positions of the viewers with respect to a display, determine a frame rate for the display based on the number of viewers, and selectively activate, for each image frame within a plurality of image frames of an image signal, at least a first light source and a second light source based on the associated positions.

According to at least one example embodiment, if the controller determines that the number of viewers is greater than 1, the controller is configured to at least one of alternately activate and simultaneously activate the first light source and the second light source for each image frame.

According to at least one example embodiment, the device includes a light guide plate (LGP) configured to guide light incident from at least one of the first light source and the second light source to form a distribution of directional light.

According to at least one example embodiment, the light guide plate includes optical patterns configured to reflect the light to generate the distribution of directional light.

According to at least one example embodiment, the device includes a light guide plate (LGP) configured to guide light incident from at least one of the first light source and the second light source. The device includes an optical film configured to form a distribution of directional light by controlling a progress path of light output from the LGP.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
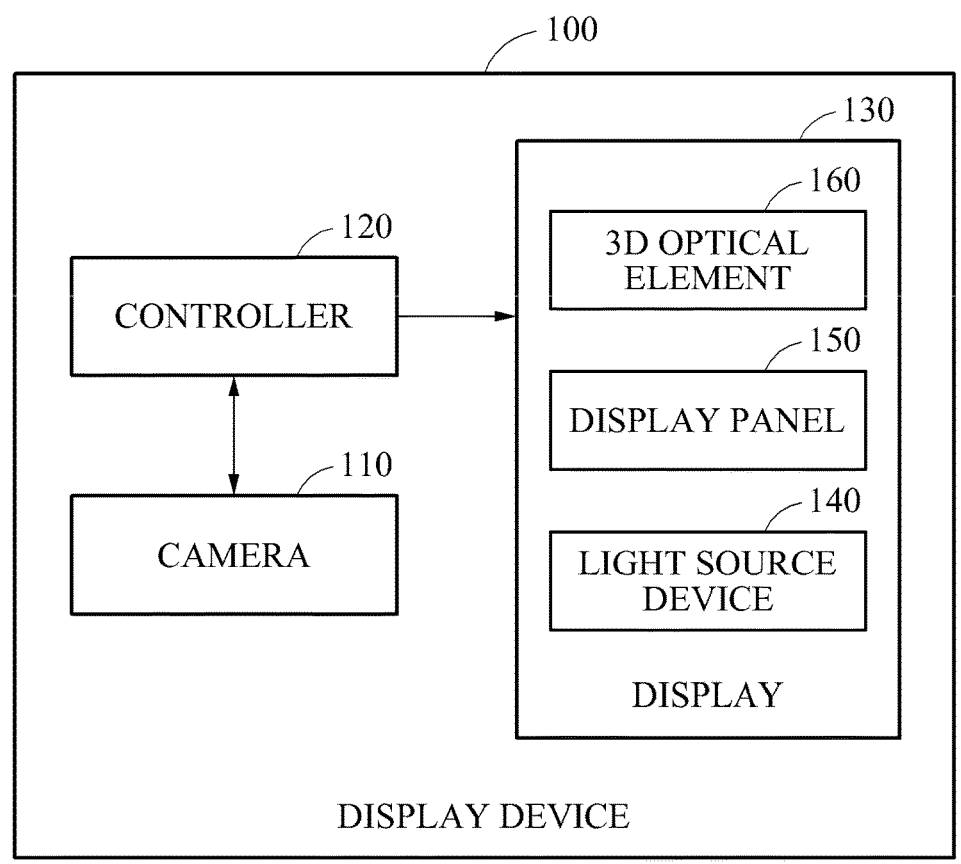
FIG. 1 illustrates an example of a three-dimensional (3D) display device according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

Various example embodiments may be applied to provide an autostereoscopic three-dimensional (3D) display based an eye tracking. For example, example embodiments may be applied to provide a 3D image by tracking a plurality of viewers in a mobile device, a monitor, a digital information display (DID), a television (TV), and the like.

FIG. 1 illustrates an example of a three-dimensional (3D) display device according to at least one example embodiment. A display device 100 may provide, for a viewer, a three-dimensional (3D) image based on a viewpoint or a position of the viewer by tracking the viewer viewing the 3D image output from the display device 100. Even when a plurality of viewers is present, the display device 100 may provide, for each of the viewers, a 3D image based on viewpoints of the viewers.

Referring to FIG. 1, the display device 100 includes a camera 110, a controller 120, and a display 130. The display 130 includes a light source device 140, a display panel 150, and a 3D optical element 160. The controller 120 may include at least one processor to process an operation of the controller 120. For example, the controller 120 may have a structure as disclosed in FIG. 11. It should be understood that the camera 110, the controller 120, and the display 130 may exist as separate devices or as part of a display device 100 as shown in FIG. 1.

The controller 120 detects a viewer using the camera 110. The camera 110 photographs a front area of the display device 100, and the controller 120 determines a position of a viewer (e.g., with respect to the display device 100) by analyzing an image photographed by the camera 110. For example, the controller 120 may determine a direction of a user, among a left direction, a right direction, and a center direction based on a central axis of a screen of the display device 100.

When viewers are detected in various directions, the controller 120 may control a frame rate indicating a speed of image frames of a 3D image. For example, when a frame rate set to be a basic frame rate is 30 frame per second (FPS) and the viewers are detected in a left direction and a right direction, the controller 120 may control the frame rate to be greater than or equal to 60 FPS and operate the display 140 according to the controlled frame rate. When the viewers are detected in a left direction, a right direction, and a center direction (e.g., three viewers), the controller 120 may control the frame rate to be greater than or equal to 90 FPS and operate the display 140 according to the controlled frame rate.

In an example, the controller 120 may detect, as feature points, positions of a face, a nose, and an eye (or eyes) of a viewer in an image photographed by the camera 110, and may determine positions of a left eye and a right eye of the viewer based on the detected positions of the feature points. The controller 120 may control the display 130 to provide a 3D image to be mapped in the right eye and the left eye of the viewer. The controller 120 may map image data in the display panel 150 to transfer a left-eye image and a right-eye image to the left eye and the right eye of the viewer, respectively. For example, the image data may refer to data including a plurality of viewpoint images corresponding to a plurality of viewing angle directions with respect to a 3D display. In a case of a binocular 3D display, the image data may refer to data including a left viewpoint image for indicating a left eye and a right viewpoint image for indicating a right eye.

The display 130 may convert the image data to a 3D image to be displayed. The light source device 140 refers to a device including a light source. For example, the light source device 140 may include a backlight unit to provide a backlight for the display panel 150. The light source device 140 may be disposed at a back of the display panel 150 and provide light for outputting an image to the display panel 150. The display panel 150 may function based on the light provided from the light source device 140.

The 3D optical element 160 may be disposed in at least one of a front and a back of the display panel 150 to enable a viewer to view different sets of pixels based on a position of a viewpoint, thereby providing the autostereoscopic 3D image. For example, the 3D optical element 160 may refer to any one of a lenticular lens, a micro lens, and a parallax barrier. Through the optical element 160, the viewer may view different viewpoint images based on a position.

The controller 120 may control operations of light sources (not shown) included in the light source device 140 based on a direction or a position at which the viewer is detected. For example, the controller 120 may selectively activate the light sources included in the light source device 140 based on the position of the viewer.

The light source device 140 may output a distribution of directional light based on a control of the controller 120. For example, the light source device 140 may output a distribution of first directional light toward a left direction when the viewer is detected in the left direction, and may output a distribution of second directional light toward a right direction when the viewer is detected in the right direction. The light source device 140 may alternately output the distribution of first directional light and the distribution of second directional light with respect to each image frame of an image signal. A cycle during which the distribution of first directional light and the distribution of second directional light are alternately output may be determined based on the frame rate. A configuration and an operation of the light source device 140 will be described in greater detail with reference to FIGS. 2A through 7C.

As described above, even when a plurality of viewers is present, the display device 100 may provide the autostereoscopic 3D display without deterioration in resolution by operating the light source device 140, based on a time division scheme, to output the distribution of directional light.

Figure 2A:
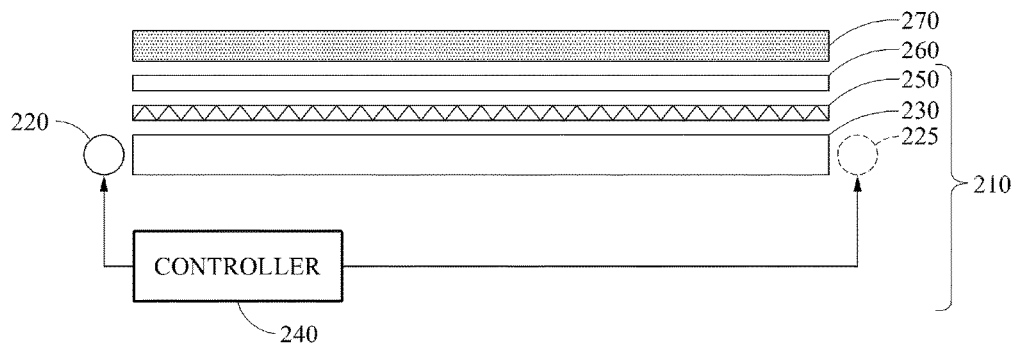
FIGS. 2A through 2C illustrate examples of a display including a light source device according to at least one example embodiment.
Figure 2B:
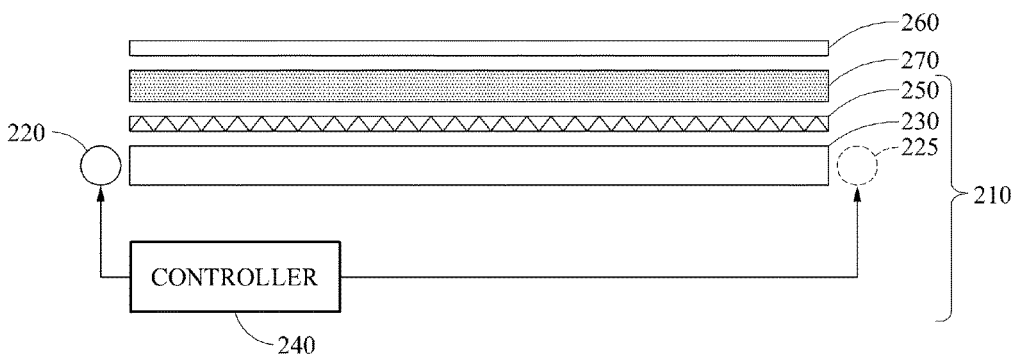
Figure 2C:
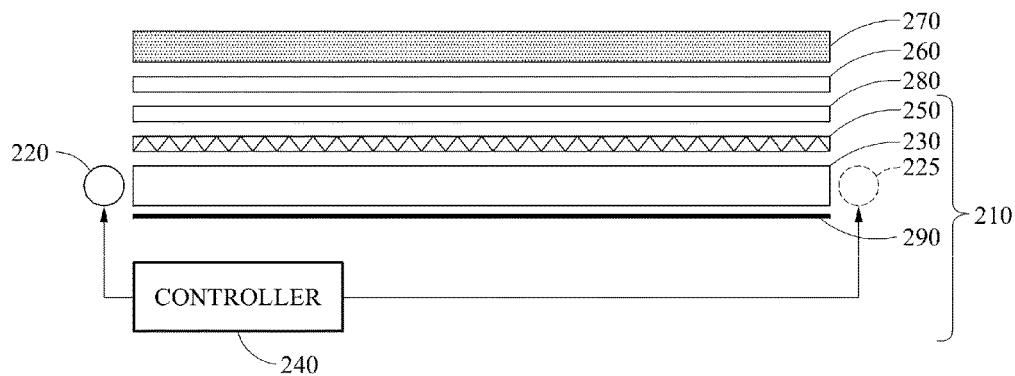

FIGS. 2A through 2C illustrate examples of a display including a light source device according to at least one example embodiment.

Referring to FIG. 2A, the display 130 in FIG. 1 includes a light source device 210, a 3D optical element 260, and a display panel 270. In this example, the light source device 210, the 3D optical element 260, and the display panel 270 may correspond to the light source device 140, the 3D optical element 160, and the display panel 150 in FIG. 1, respectively. As illustrated in FIG. 2A, the light source device 210 includes a first light source 220, a second light source 225, a light guide plate (LGP) 230, a controller 240, and an optical film 250. Hereinafter, a term "film" may be referred to as a "sheet."

The first light source 220 and the second light source 225 may generate light under a control of the controller 240. For example, the first light source 220 and the second light source 225 may be light emitting diodes (LEDs), however, the first light source 220 and the second light source 225 are not limited thereto. The first light source 220 may be arranged in one side of the LGP 230, and the second light source 225 may be arranged in another side of the LGP 230. The LGP 230 may guide light incident from at least one of the first light source 220 and the second light source 225, and output the light to be widely spread. In this example, the LGP 230 may output the light in an inclined direction based on an optical pattern disposed in a lower portion of the LGP 230. The optical pattern may reflect or scatter the light to emit the light to an area outside of the LGP 230.

The LGP 230 may be composed of materials such as, for example, a poly methyl methacrylate (PMMA), a polyethersulfone (PES), and a poly carbonate (PC). The LGP 230 may have a flat type shape of which a thickness is regular, or a wedge type shape of which a surface in which light flows is thick and an opposite surface is thin. However, example embodiments are not limited to the foregoing.

The optical film 250 may form a distribution of directional light of which the light is directed in a desired (or alternatively, predetermined) direction by controlling a progress path of light output from the LGP 230. The optical film 250 may be disposed in an upper portion of the LGP 230. For example, the optical film 250 may be a prism film.

Light via the optical film 250 may arrive at the display panel 270 through the 3D optical element 260, and a 3D image may be output from the display panel 270. The light output from the light source device 210 may pass through the display panel 270 via the 3D optical element 260 to form a 3D light distribution and may be intensively transferred to a viewer in a desired (or alternatively, predetermined) position. The 3D optical element 260 may form a 3D point in time within a light distribution so that the viewer is able to view different sets of pixels based on a position of a viewpoint, thereby providing images of different viewpoints. The 3D optical element 260 may include any one of a lenticular lens and a parallax barrier, or include the lenticular lens and the parallax barrier. When the lenticular and the parallax barrier are included, the lenticular lens may refract light toward a slot of the parallax barrier, and the parallax barrier may form a 3D point in time based on a transferred light.

The 3D optical element 260 may be disposed in back of the display panel 270 as illustrated in FIG. 2A, or disposed in front of the display panel 270 as illustrated in FIG. 2B. However, example embodiments are not limited to the foregoing. For example, the display panel 270 may be a liquid crystal display (LCD) panel having subpixels arranged based on a matrix form.

The controller 240 may control whether at least one of the first light source 220 and the second light source 225 is activated to control a directivity of the light output from the light source device 210. The controller 240 may selectively activate the first light source 220 and the second light source 225 based on a position of a viewer and control a point in time at which the first light source 220 and the second light source 225 are activated. Based on whether at least one of the first light source 220 and the second light source 225 is activated, distributions of different directional lights may be formed.

FIG. 2C illustrates a configuration of the light source device 210 according to at least one example embodiment. The light source device 210 may further include an optical film 280 and a reflective film 290 to perform different functions of the optical film 250, in addition to the optical film 250. The reflective film 290 may reduce an optical loss by reflecting light arriving at a lower portion and a side portion of the LGP 230 so that the light guided in the LGP 230 is not externally output through the lower portion and the side portion of the LGP 230. The optical film 280 may diffuse the light via the optical film 250. For example, the optical film 280 may be a diffuser film. The light via the optical film 280 may arrive at the display panel 270 through the 3D optical element 260, and a 3D image may be output from the display panel 270.

The light source device 210 may further include a third optical film, for example, a brightness enhancement film (BEF) (not shown) or a protection film (not shown), to enhance brightness of light, in addition to the first and second optical films discussed above.

Figure 3A:
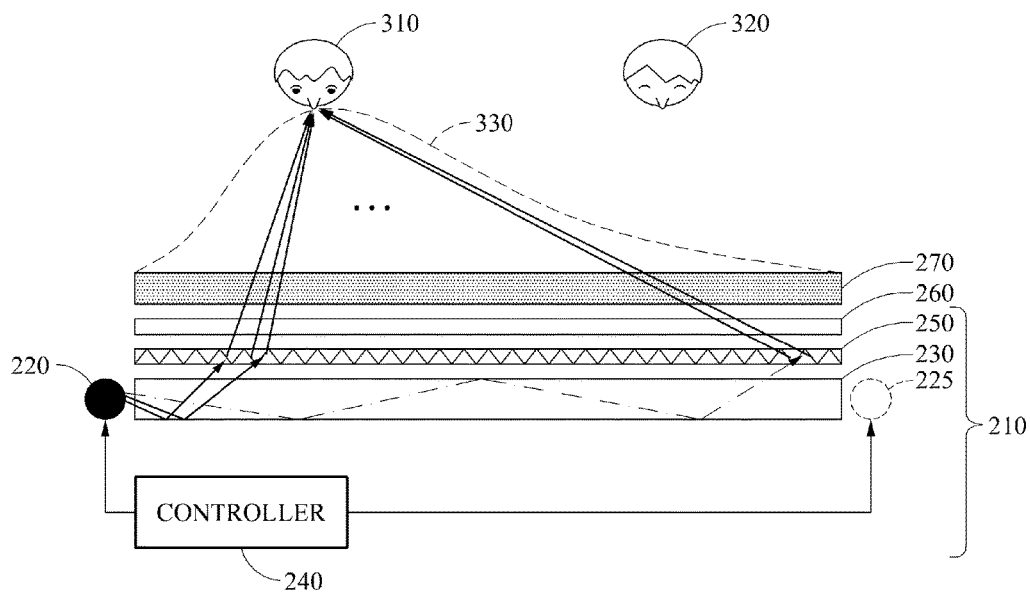
FIGS. 3A and 3B illustrate examples of a light source device to output distributions of different directional lights according to at least one example embodiment.
Figure 3B:
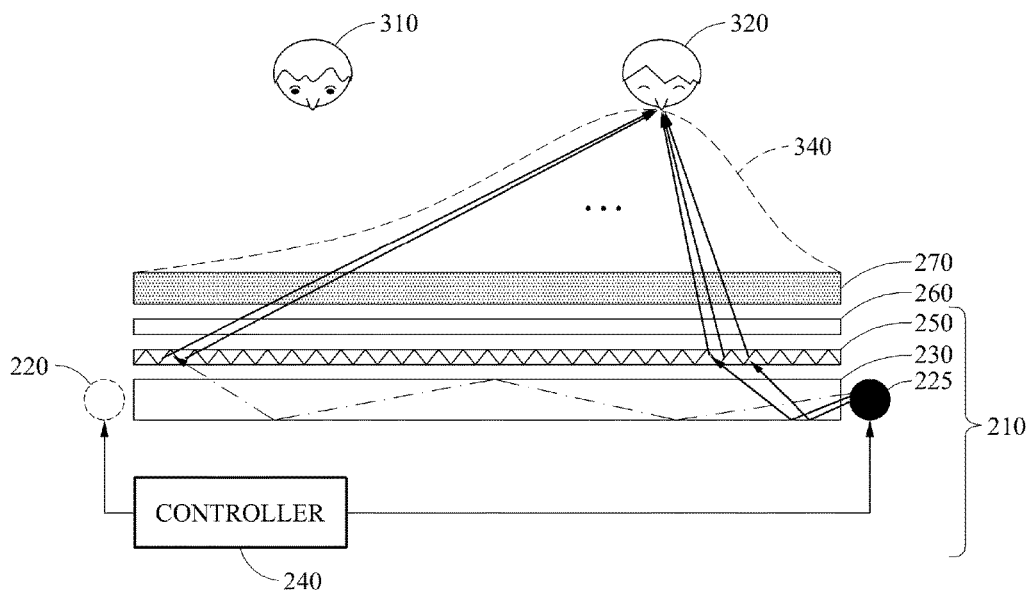

FIGS. 3A and 3B illustrate examples of a light source device to output distributions of different directional lights according to at least one example embodiment. Referring to FIGS. 3A and 3B, it is assumed the display device 100 detects a first viewer 310 positioned in a left direction and a second viewer 320 positioned in a right direction, through the camera 110.

FIG. 3A illustrates an example of a light distribution 330 output from the light source device 210, at a first point in time. At the first point in time, the controller 240 may control the first light source 220 and the second light source 225 of the light source device 210 to output a distribution of first directional light toward the first viewer 310 from the light source device 210.

The controller 240 may activate, for example, turn on, the first light source 220 to form the distribution of first directional light, and deactivate, for example, turn off, the second light source 225. Light may be output from the activated first light source 220, and light incident from the first light source 220 to the LGP 230 may be diffused, reflected, or scattered by an optical pattern disposed in the LGP 230 to output the light to an area outside of the LGP 230. A progress path of the light output from the LGP 230 may be controlled by the optical film 250, thereby forming the distribution of first directional light toward the first viewer 310. The distribution of first directional light may pass through the 3D optical element 260 and the display panel 270 to generate a 3D image. The 3D image may be provided for the first viewer 310, and the first viewer 310 may view the 3D image output from the display device 100. In this example, the second viewer 320 may not be included in a field of vision of the 3D image output by the display device 100, so that the second viewer 320 may not recognize the 3D image (or views a distorted image).

FIG. 3B illustrates an example of the light distribution 340 output from the light source device 210, at a second point in time. At the second point in time, the controller 240 may control the first light source 220 and the second light source 225 of the light source device 210 to output a distribution of second directional light toward the second viewer 310 from the light source device 210.

The controller 240 may deactivate, for example, turn off, the first light source 220 to form the distribution of second directional light, and activate, for example, turn on, the second light source 225. Similar to what is illustrated in FIG. 3A, light output from the activated second light source 225 may be incident to the LGP 230, and the distribution of second directional light may be formed by the optical film 250 and the optical pattern disposed in the LGP. The distribution of second directional light may pass through the 3D optical element 260 and the display panel 270 to generate the 3D image, and the generated 3D image may be provided for the second viewer 320. In this example, the first viewer 310 may be not included in the field of vision of the 3D image output by the display device 100, so that the first viewer 310 may not recognize the 3D image (or views a distorted image).

As described above, the light source device 210 may alternately output the light distributions toward the first viewer 310 and the second viewer 320 based on a time division scheme. To alternately form the distributions of the different directional lights, the first light source 220 and the second light source 225 may be alternately activated.

With respect to an identical image frame (or each image frame within a plurality of image frames of an image signal), the controller 240 may control the light source device 210 to output the light distribution toward the first viewer 310 at the first point in time, and the light distribution toward the second viewer 320 at the second point in time. The controller 240 may iteratively perform the aforementioned process with respect to other image frames.

As described above, the controller 240 may set a frame rate of the display to be relatively high such that the first viewer 310 and the second viewer 320 may not recognize that the 3D image is not provided. For example, it is assumed that a viewer recognizes a disconnection of an image when the frame rate is less than 30 FPS (i.e., when the output is less than 30 image frames within one second). In this example, the controller 240 may control and output at least 30 image frames to each of the first viewer 310 and the second viewer 320 within one second by setting the frame rate to be greater than or equal to 60 FPS.

Figure 4A:
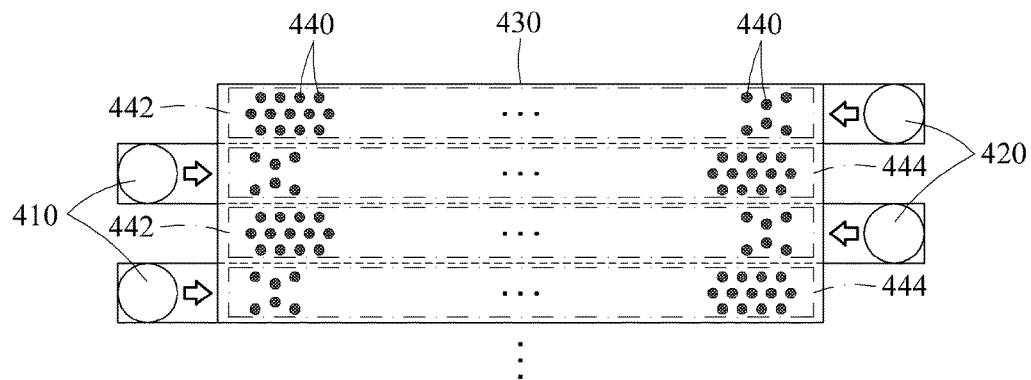
FIG. 4A illustrates an example of a light source device according to at least one example embodiment.

FIG. 4A illustrates an example of a light source device according to at least one example embodiment. Referring to FIG. 4A, a first light source 410 may be arranged in one side of a light guide plate (LGP) 430, and a second light source 420 may be arranged in another side of the LGP 430. In an example, the first light source 410 and the second light source 420 may be alternately arranged at a right side and a left side of the LGP 430 based on the LGP 430.

The LGP 430 may have an optical pattern 440 to output an incident light to an area outside of the LGP by reflecting or scattering the incident light. For example, the optical pattern 440 may be formed in a lower portion of the LGP 430. In the LGP 430, a first optical pattern array 444 to output light incident from the first light source 410 in a first direction and a second optical pattern array 442 to output light incident from the second light source 420 in a second direction are alternately arranged.

In the LGP 430, an area relatively close to the first light source 410 and the second light source 420 may have a lower density optical pattern 440 than an area relatively far from the first light source 410 and the second light source 420. Light may be equally output to the area outside of the LGP 430 by alternately arranging the first optical pattern array 444 and the second optical pattern array 442 and by designing different densities of the optical pattern 440 formed in the LGP 430 based on a distance from a light source.

Figure 4B:
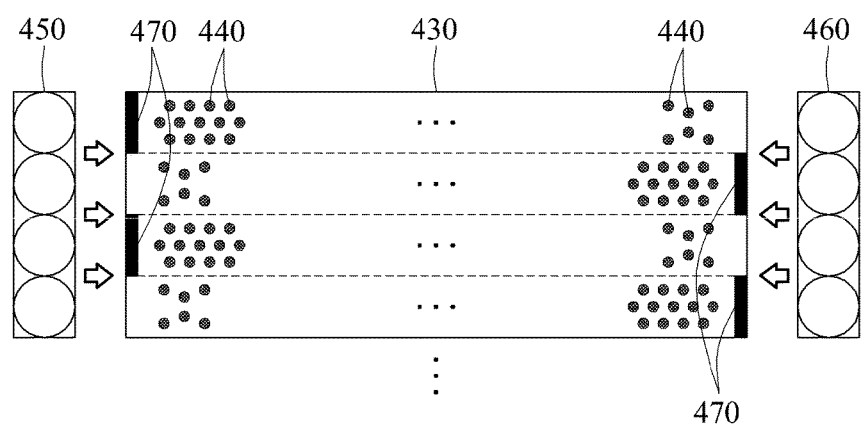
FIG. 4B illustrates another example of a light source device according to at least one example embodiment.

FIG. 4B illustrates another example of a light source device according to at least one example embodiment. Referring to FIG. 4B, differently from FIG. 4A, a first light source array 450 and a second light source array 460 including a plurality of light sources may be arranged in one side and another side of the LGP 430, respectively. A light blocker (or light blocking element) 470 to block light to be incident to the LGP 430 may be additionally provided to design and change the LGP 430 so that light is alternately incident to the LGP 430. As identically described in FIG. 4A, a progress path of the light incident to the LGP 430 may be changed by the optical pattern 440, and the incident light may be output to the area outside of the LGP 430.

Figure 5:
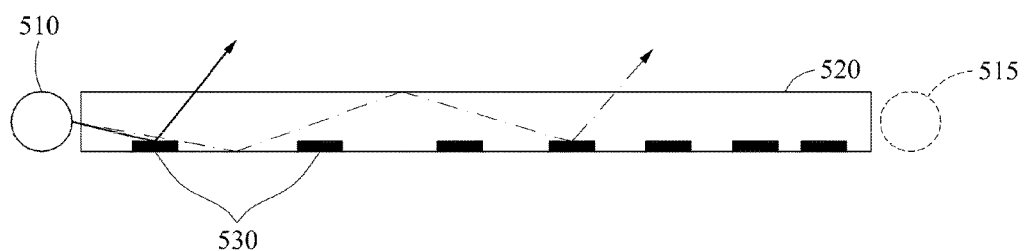
FIG. 5 illustrates an example of a movement of light in a light guide plate according to at least one example embodiment.

FIG. 5 illustrates an example of a movement of light in a light guide plate (LGP) according to at least one example embodiment.

Referring to FIG. 5, when a first light source 510 arranged in one side of an LGP 520 is activated, light output from the first light source 510 may be incident to the LGP 520, and the LGP 520 may guide the light incident from the first light source 510 based on a total internal reflection (TIR) condition. In this example, the TIR condition may be broken by an optical pattern 530 in a shape of a prism or a hemisphere disposed in a lower portion of the LGP 520, so that the light may be emitted to an area outside of (or external to) the LGP 520. The optical pattern 530 may be a physical structure that is formed in at least a portion of the LGP 520 and that changes a progress path of the light incident from the first light source 510. In the optical pattern 530, the light incident from the first light source 510 to be guided in the LGP 520 may be refracted or reflected in various directions, thereby generating directional rays. Such directional rays may pass through an optical film, for example, a prism film, disposed in a lower portion of the LGP 520 to form a distribution of directional light, and the distribution of directional light may pass through a 3D optical element and a display panel, thereby generating a 3D image. When a second light source 515 arranged in another side of the LGP 520 is activated, the light may be emitted to the area outside of the LGP 520, thereby forming the distribution of directional light based on a process identical to the aforementioned process.

Figure 6A:
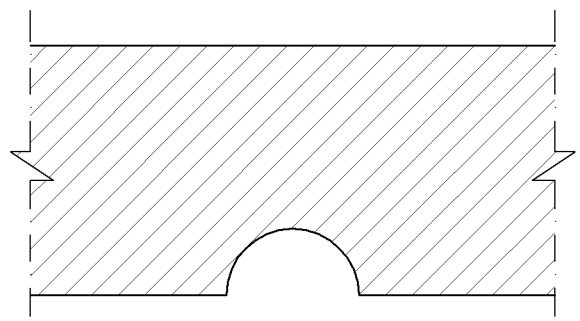
FIGS. 6A through 6C illustrate examples of an optical pattern of a light guide plate according to at least one example embodiment.
Figure 6B:
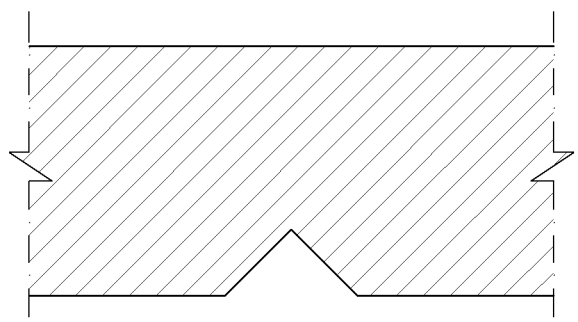
Figure 6C:
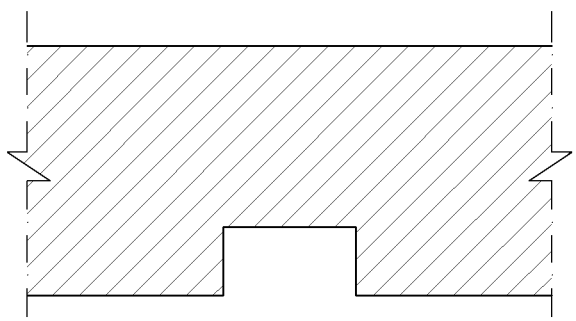

In an example, a shape and a structure of the optical pattern 530 may be variously changed and designed. Referring to FIGS. 6A through 6C, example embodiments of a structure of the optical pattern 530 are illustrated. FIG. 6A is a cross-sectional view of an example of an LGP. Referring to FIG. 6A, a shape of an optical pattern in the LGP may be hemispheric. FIG. 6B is a cross-sectional view of another example of an LGP. Referring to FIG. 6B, a cross section of an optical pattern in the LGP may be triangular. FIG. 6C is a cross-sectional view of still another example of an LGP. Referring to FIG. 6C, a cross section of an optical pattern in the LGP may be rectangular. A shape of the optical pattern is various and not limited to the aforementioned examples.

Figure 7A:
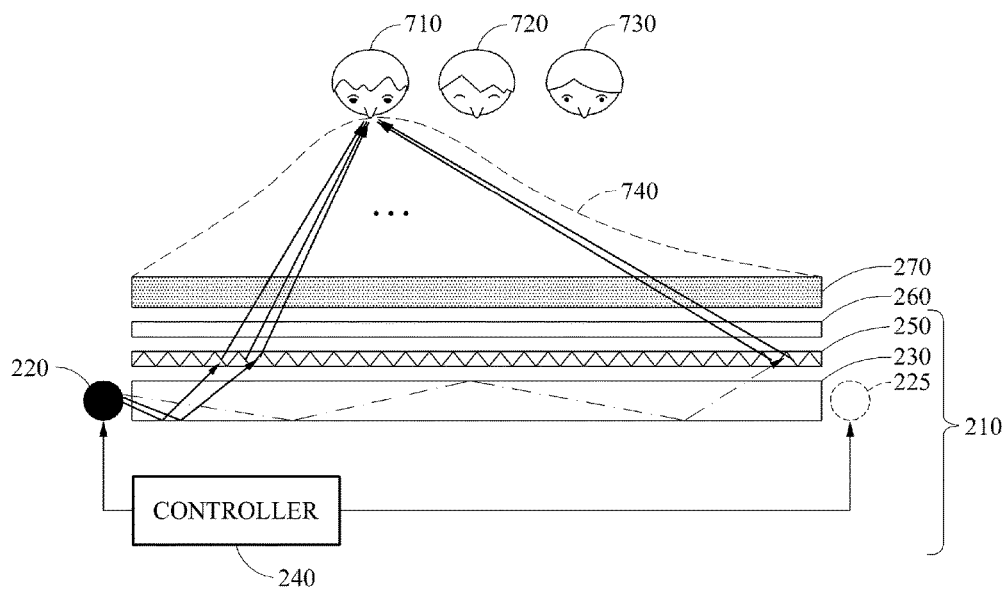
FIGS. 7A through 7C illustrate examples of a light source device to output distributions of different directional lights according to at least one example embodiment.
Figure 7B:
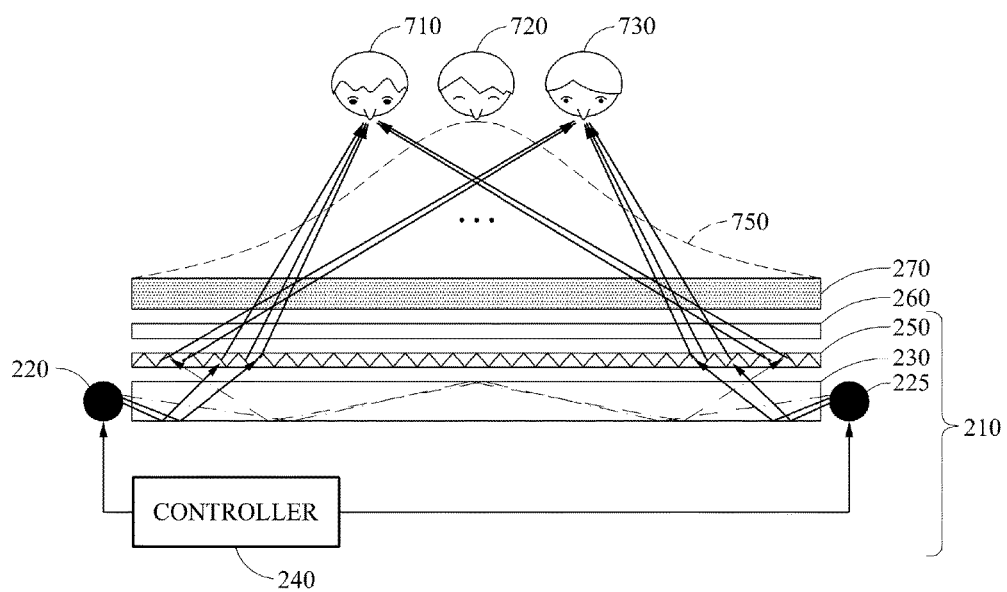
Figure 7C:
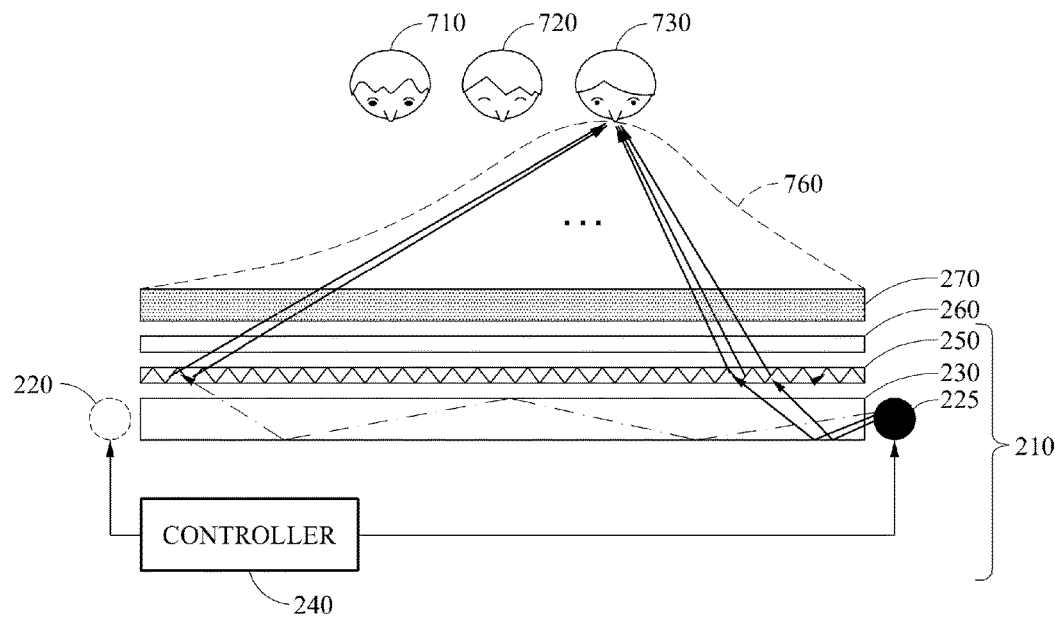

FIGS. 7A through 7C illustrate examples of a light source device to form distributions of different directional lights according to at least one example embodiment. Referring to FIGS. 7A through 7C, it is assumed that the display device 100 detects a first viewer 710 positioned in a left direction, a second viewer 720 positioned in a center direction, and a third viewer 730 positioned in a right direction, through the camera 110.

FIG. 7A illustrates a light distribution 740 output from the light source device 210 at a first point in time. Referring to FIG. 7A, similar to what is illustrated in FIG. 3A, the controller 240 may control the light source device 210 to output a distribution of first directional light toward the first viewer 710 from the light source device 210. The controller 240 may activate the first light source 220 and deactivate the second light source 225 to form the distribution of first directional light.

FIG. 7B illustrates a light distribution 750 output from the light source device 210 at a second point in time which is a next point in time of the first point in time. Referring to FIG. 7B, the controller 240 may control the light source device 210 to output a distribution of second directional light toward the second viewer 720 from the light source device 210. The controller 240 may activate the first light source 220 and the second light source 225 to output the distribution of second directional light. The distribution of second directional light may be formed by overlapping a light distribution formed based on light emitted from the first light source 220 and a light distribution formed based on light emitted from the second light source 225.

FIG. 7C illustrates a light distribution 760 output from the light source device 210 at a third point in time which is a next point in time of the second point in time. Referring to FIG. 7C, similar to what is illustrated in FIG. 3B, the controller 240 may control the light source device 210 to output a distribution of third directional light toward the third viewer 730 from the light source device 210. The controller 240 may deactivate the first light source 220 and activate the second light source 225 to form the distribution of third directional light.

The light source device 210 may alternately output the light distributions toward each of the viewers 710, 720, and 730 based on a time division scheme. The processes illustrated in FIGS. 7A through 7C may be iteratively performed with respect to each image frame to be output through the display panel 270.

Figure 8:
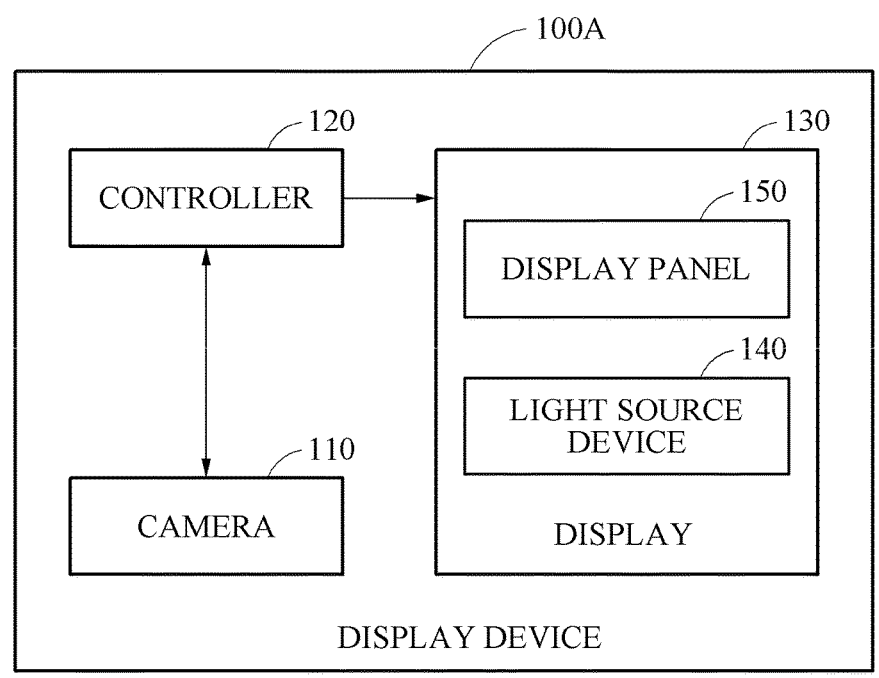
FIG. 8 illustrates another example of a display device according to at least one example embodiment.

FIG. 8 illustrates another example of a display device according to at least one example embodiment. Referring to FIG. 8, the display device 100A may generate a 3D image without an additional 3D optical element, differing from the display device illustrated in FIG. 1. The light source device 140 included in the display 130 may form a light distribution of a line-type light pattern and the display panel 150 may generate the 3D image based on the light distribution of the line-type light pattern provided from the light source device 140. For example, the line-type light pattern may be a pattern of stripes that alternately represents an area to which light is transferred and an area to which the light is not transferred. The light source device 140 may function as a parallax barrier by providing the line-type light pattern for the display panel 150. A structure and an operation of an optical device will be described in greater detail with reference to FIGS. 9A and 9B.

As identically described in FIG. 1, the controller 120 may selectively activate light sources included in an optical device to control a distribution of directional light formed by the light source device 140. For a detailed description, reference may be made to the description provided with reference to FIGS. 1, 3A, 3B, and 7A through 7C, and repeated descriptions will be omitted for increased clarity and conciseness. With respect to other components that are not included in the foregoing description, reference may be made to the description provided with reference to FIG. 1.

Figure 9A:
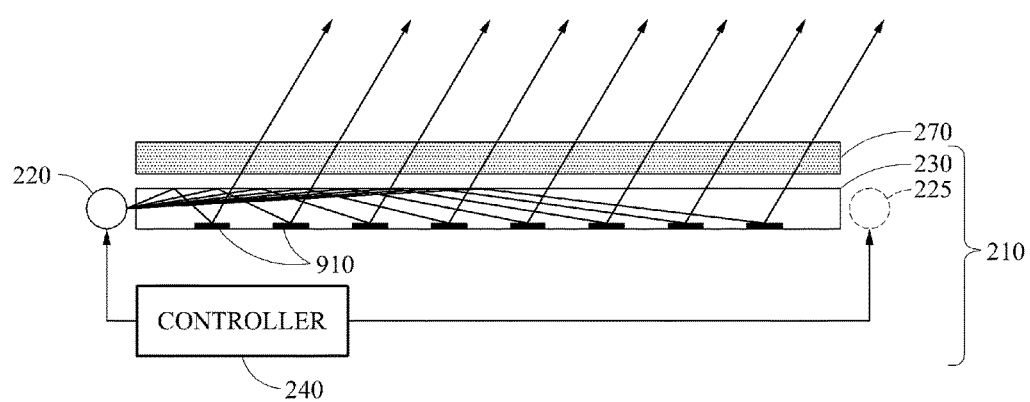
FIGS. 9A and 9B illustrate examples of a light source device to form a light distribution of a line-type light pattern according to at least one example embodiment.
Figure 9B:
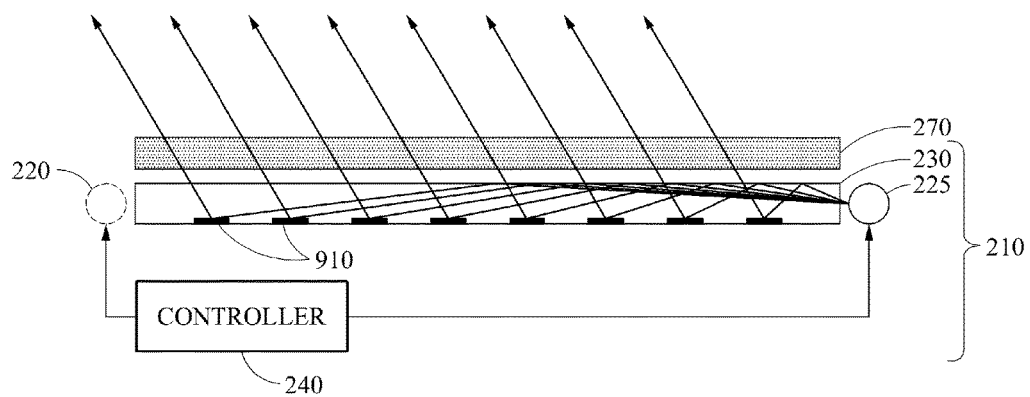

FIGS. 9A and 9B illustrate examples of a light source device to form a light distribution of a line-type light pattern according to at least one example embodiment.

FIG. 9A illustrates a light pattern output from the light source device 210 at a first point in time. The light source device 210 includes the first light source 220, the second light source 225, and the LGP 230, and the controller 240. The LGP 230 may form a light distribution of a line-type light pattern based on light incident to at least one of the first light source 220 and the second light source 225. The LGP 230 may provide, for the display panel 270, the line-type light pattern of which a light path is divided, and the display panel 270 may output a 3D image based on light of the line-type light pattern provided from the LGP 230.

Optical patterns 910 may be arranged in the LGP 230 to emit light incident to the LGP to an area outside of the LGP 230 by reflecting or scattering the light. The optical patterns 910 may be arranged in a lower portion of the LGP 230 and intervals between the optical patterns 910 may be identical, however, this is only an example. In an example, even when an area relatively close to a light source from the LGP 230 has a lower density of the optical patterns 910 than an area relatively far from the light source, the intervals between the optical patterns 910 arranged in the LGP 230 may be identical.

When the intervals between the optical patterns 910 are identical and angles at which lights reflected or refracted by the optical patterns 910 and emitted from the LGP 230 are identical to each other, an area to which light is transferred and an area to which the light is not transferred may be alternately represented in the light pattern to be output to the area outside of the LGP 230. Thus, the LGP 230 may function as a parallax barrier to divide the light path and may output a 3D image, for example, a stereo image, based on the line-type light pattern provided from the LGP 230, like the parallax barrier but without an additional 3D optical element.

In the lower portion of the LGP 230, an area in which the optical patterns 910 are arranged may function as a slit portion of the parallax barrier, such that light is emitted to the area outside of the LGP 230. An area of the LGP 230 in which the optical patterns 910 are not arranged, thereby totally reflecting the light, may function as a shield portion of the parallax barrier, so that the light is not emitted to the area outside of the LGP 230. The line-type light pattern formed by the LGP 230 may be a pattern of stripes that arranges slit portions in parallel, in between the shield portion, and the slit portions may have vertically long slit shapes.

The controller 240 may control a directivity of the line-type light pattern formed by the LGP 230 by controlling whether at least one of the first light source 220 and the second light source 225 is activated. Similar to what is illustrated in FIG. 3A, the controller 240 may activate the first light source 220 and deactivate the second light source 225 to form a distribution of first directional light.

FIG. 9B illustrates a light pattern output from the light source device 210 at a second point in time which is a next point in time of the first point in time. As illustrated in FIG. 3B, at the second point in time, the controller 240 may deactivate the first light source 220 and activate the second light source 225 to form a distribution of second directional light.

As illustrated in FIGS. 9A and 9B, the light source device 210 may further include an optical film to control a form of the light distribution by controlling a path of the light output to the LGP 230. As illustrated in FIGS. 7A through 7C, an operation of the light source device 210 may be extended to form the distribution of first directional light, the distribution of second directional light, and the distribution of third directional light.

Figure 10:
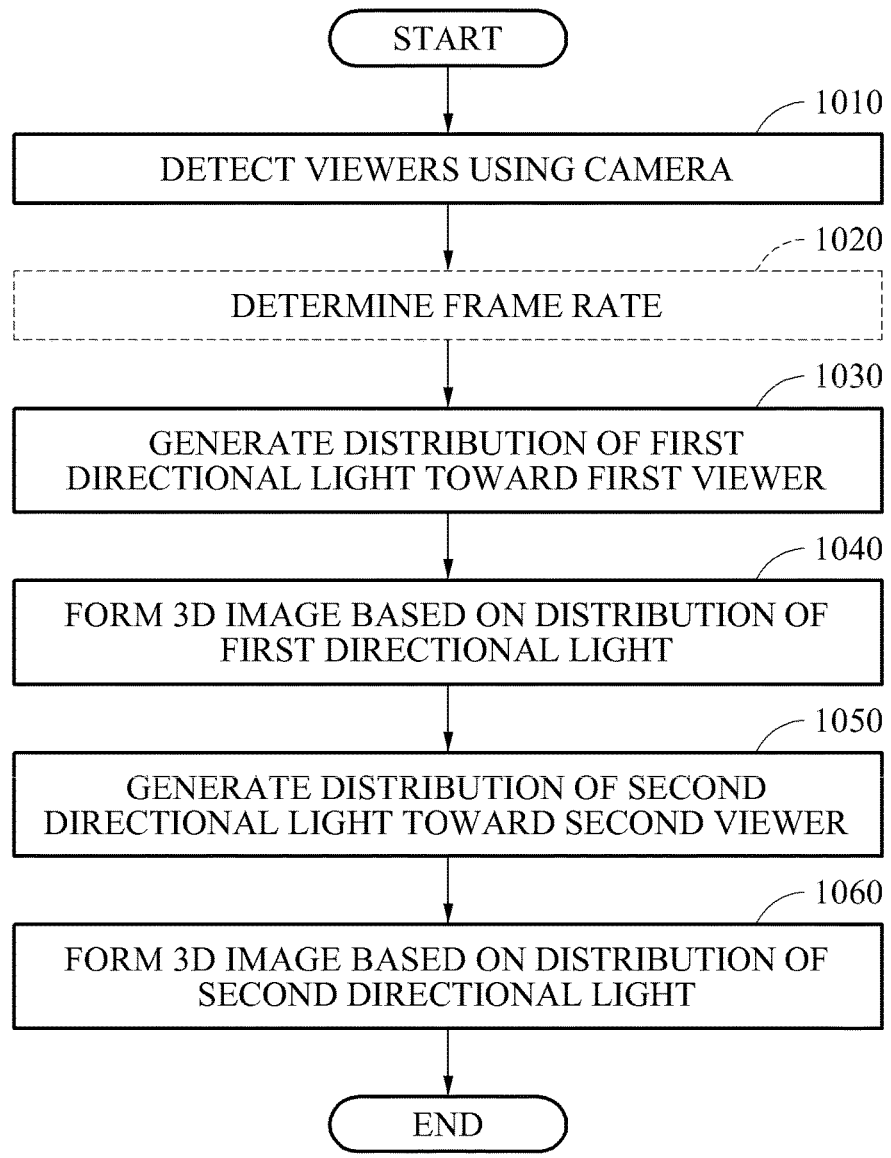
FIG. 10 is a flowchart illustrating an example of a display method according to at least one example embodiment.

FIG. 10 is a flowchart illustrating an example of a display method according to at least one example embodiment. The display method may be executed by the display device 100 through the controller 120 that includes at least one processor (see, for example, FIG. 11) for carrying out the method.

Referring to FIG. 10, in operation 1010, the display device 100 detects viewers using the camera 110. The display device 100 may photograph a front area of the display device 100 using the camera 110 and determine positions of the viewers by analyzing an image photographed by the camera 110. In this example, the display device 100 is assumed to provide a 3D image for each of a first viewer and a second viewer positioned in different directions.

In operation 1020, the display device 100 selectively determines a frame rate to be applied to a display of the 3D image based on a result of the detecting in operation 1010. For example, the display device 100 may determine to output the 3D image based on a frame rate greater than at least two times an original frame rate in order to output a sufficient number of image frames to the first viewer and the second viewer detected in two directions.

In operation 1030, the display device 100 generates a distribution of first directional light toward the first viewer. As illustrated in FIG. 3A, the display device 100 may selectively activate light sources included in a light source device and generate the distribution of first directional light based on an optical film to change a path of light and an optical pattern formed in an LGP.

In operation 1040, the display device 100 forms a 3D image based on the distribution of first directional light. The distribution of first directional light may pass through a display panel and a 3D optical element to form the 3D image, and the 3D image may be provided based on a field of vision toward the first viewer.

In operation 1050, the display device 100 generates a distribution of second directional light toward the second viewer. As illustrated in FIG. 3B, the display device 100 may selectively activate the light sources included in the light source device, and generate the distribution of second directional light based on the optical film to change the path of light and the optical pattern formed in the LGP.

In operation 1060, the display device 100 forms the 3D image based on the distribution of second directional light. The distribution of second directional light may pass through the display panel and the 3D optical element to form the 3D image, and the 3D image may be provided based on a field of vision toward the second viewer.

The display device 100 may iteratively perform operations 1030 through 1060 with respect to each image frame. Based on the aforementioned process, the display device 100 may perform an autostereoscopic display based on a point in time for each viewer without deterioration in resolution.

When the viewers are detected in three directions in operation 1010, subsequently to operation 1060, the display device 100 may generate a distribution of third directional light and form the 3D image based on the distribution of third directional light as described in FIGS. 7A through 7C.

Figure 11:
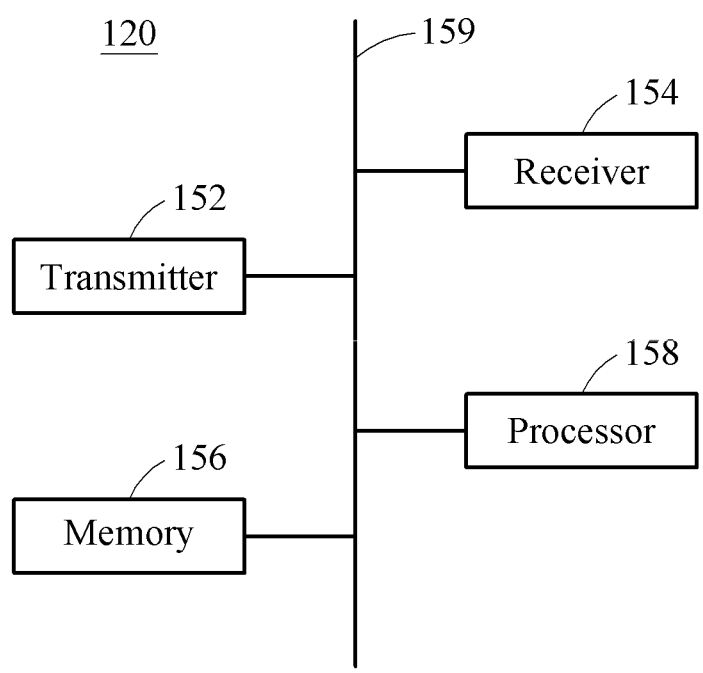
FIG. 11 is an example structure of the controller in FIGS. 1 and 8.

FIG. 11 is an example structure of the controller in FIGS. 1 and 8.

FIG. 11 is a diagram illustrating an example structure of the controller 120 according to an example embodiment. Referring to FIG. 11, the controller may include, for example, a data bus 159, a transmitter 152, a receiver 154, a memory 156, and a processor 158.

The transmitter 152, receiver 154, memory 156, and processor 158 may send data to and/or receive data from one another using the data bus 159. The transmitter 152 is a device that includes hardware and any necessary software for transmitting signals including, for example, data signals and control signals to the camera 110, display 130 and/or a host (not shown).

The receiver 154 is a device that includes hardware and any necessary software for receiving signals including, for example, data signals and control signals to and from the camera 110, display 130 and/or a host (not shown).

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code stored on the memory 156. For example, it should be understood that the modifications and methods according to example embodiments may be stored on the memory 156 and implemented by the processor 158.

Further, it should be understood that the below modifications and methods may be carried out by one or more of the above described elements of the controller 120. For example, the receiver 154 may carry out steps of "receiving," "acquiring," and the like; transmitter 152 may carry out steps of "transmitting," "outputting," "sending" and the like; processor 158 may carry out steps of "determining,"

"generating", "correlating," "calculating," "controlling" and the like; and memory 156 may carry out steps of "storing," "saving," and the like.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device comprising:
    a first light source;
    a second light source;
    a light guide plate (LGP) configured to guide light incident from at least one of the first light source and the second light source;
    an optical film configured to form a distribution of directional light by controlling a progress path of light output from the LGP;
    a controller configured to control activation of at least one of the first light source and the second light source; and
    a three-dimensional (3D) optical element configured to form a 3D light distribution based on the directional light, the 3D optical element is a parallax barrier configured to form a 3D point in time based on the directional light being directed toward a slot of the parallax barrier,
    wherein, based on the first light source being activated, a distribution of first directional light is formed by the LGP and the optical film, and a 3D image toward a first direction is formed based on the distribution of the first directional light and the 3D optical element, wherein the 3D optical element forms the 3D image toward the first direction based on the distribution of the first directional light being directed toward the slot,
    wherein, based on the second light source being activated, a distribution of second directional light is formed by the LGP and the optical film, and a 3D image toward a second direction is formed based on the distribution of the second directional light and the 3D optical element, wherein the 3D optical element forms the 3D image toward the second direction based on the distribution of the second directional light being directed toward the slot.

2. The display device of claim 1, wherein the controller is configured to activate the first light source and deactivate the second light source to form the distribution of first directional light, and
    deactivate the first light source and activate the second light source to form the distribution of second directional light.

3. The display device of claim 2, wherein the controller is configured to activate the first light source and the second light source to form a distribution of third directional light.

4. The display device of claim 2, wherein the controller is configured to alternately activate the first light source and the second light source to alternately form the distribution of first directional light and the distribution of second directional light.

5. The display device of claim 1, wherein the LGP has an optical pattern configured to reflect or scatter light to output the light incident from at least one of the first light source and the second light source to an area external to the LGP.

6. The display device of claim 5, wherein the LGP includes a first area relatively close to the first light source that has a lower density optical pattern than a second area that is further from the first light source than the first area.

7. The display device of claim 5, wherein the LGP includes a first optical pattern array and a second optical pattern array alternately arranged, the first optical pattern array being configured to output light incident from the first light source in the first direction, the second optical pattern array configured to output light incident from the second light source in the second direction.

8. The display device of claim 1, wherein the first light source is arranged at one side of the LGP,
the second light source is arranged at another side of the LGP, and
the first light source and the second light source are alternately arranged based on a structure of the LGP.

9. A display device comprising:
a first light source;
a second light source;
a light guide plate (LGP) configured to form a light distribution of a line-type light pattern based on light incident from at least one of the first light source and the second light source;
a three-dimensional (3D) optical element configured to form a 3D light distribution based on the light distribution, the 3D optical element is a parallax barrier configured to form a 3D point in time based on the light distribution being directed toward a slot of the parallax barrier; and
a controller configured to control a directivity of the line-type light pattern by controlling activation of at least one of the first light source and the second light source,
wherein, based on the first light source being activated, a distribution of a first directional line-type light pattern is formed by the LGP and a 3D image toward a first direction is formed based on the distribution of the first directional line-type light pattern, wherein the 3D optical element forms the 3D image toward the first direction based on the distribution of the first directional line-type light pattern being directed toward the slot,
wherein, based on the second light source being activated, a distribution of a second directional line-type light pattern is formed by the LGP and a 3D image toward a second direction is formed based on the distribution of the second directional line-type light pattern, wherein the 3D optical element forms the 3D image toward the second direction based on the distribution of the second directional line-type light pattern being directed toward the slot.

10. The display device of claim 9, wherein the line-type light pattern is a pattern of stripes of light transferred to an area.

11. The display device of claim 9, wherein
the LGP includes optical patterns configured to emit light incident to the LGP to an area external the LGP by reflecting or scattering the light, and
intervals between the optical patterns are identical.

12. The display device of claim 11, wherein the LGP includes a first area relatively close to the first light source that has lower density optical patterns than a second area that is further from the first light source than the first area.

13. The display device of claim 9, wherein the controller is configured to activate the first light source and deactivate the second light source to form a distribution of first directional light, and deactivate the first light source and activate the second light source to form a distribution of second directional light.

14. A display device comprising:
a camera configured to detect at least one viewer;
a light source device configured to form a distribution of directional light;
a display panel configured to output an image based on the distribution of directional light; and
a controller configured to selectively activate light sources in the light source device based on a position of the at least one viewer,
wherein the light source device includes
a first light source,
a second light source,
a light guide plate (LGP) configured to guide light incident from at least one of the first light source and the second light source,
an optical film configured to form the distribution of directional light by controlling a progress path of light output from the LGP, and
a three-dimensional (3D) optical element configured to form a 3D light distribution based on the directional light, the 3D optical element is a parallax barrier configured to form a 3D point in time based on the directional light being directed toward a slot of the parallax barrier,
wherein, based on the first light source being activated, a distribution of first directional light is formed by the LGP and the optical film, and a 3D image toward a first direction is formed based on the distribution of the first directional light being directed toward the slot of the parallax barrier,
wherein, based on the second light source being activated, a distribution of second directional light is formed by the LGP and the optical film, and a 3D image toward a second direction is formed based on the distribution of the second directional light being directed toward the slot of the parallax barrier.

15. The display device of claim 14, wherein, if the at least one viewer is a plurality of viewers that are detected in a plurality of directions, the controller is configured to alternately activate the first light source and the second light source to alternately form light distributions toward the plurality of viewers.

16. The display device of claim 14, wherein the controller is configured to control activation of at least one of the first light source and the second light source in order to control the distribution of directional light.

17. The display device of claim 16, wherein the controller is configured to activate the first light source and deactivate the second light source if the viewer is detected in the first direction, and
deactivate the first light source and activate the second light source if the viewer is detected in the second direction.

18. The display device of claim 17, wherein the controller is configured to activate the first light source and the second light source if the viewer is detected in a third direction between the first direction and the second direction.

19. The display device of claim 14, wherein the LGP includes a first optical pattern array and a second optical pattern array alternately arranged, the first optical pattern array being configured to output light incident from the first light source in the first direction, the second optical pattern array being configured to output light incident from the second light source in the second direction.

20. The display device of claim 14,
wherein the LGP configured to form a light distribution of a line-type light pattern based on light incident from at least one of the first light source and the second light source, and
the controller is configured to control a directivity of the line-type light pattern.

21. The display device of claim 20, wherein the display panel is configured to output a three-dimensional (3D) image based on the light distribution of the line-type light pattern.

22. A display method comprising:
detecting viewers using a camera;
forming a distribution of first directional light toward a first viewer from among the viewers;
outputting a 3D image based on the distribution of first directional light;
forming a distribution of second directional light toward a second viewer from among the viewers; and
outputting a 3D image based on the distribution of second directional light,
wherein, based on a first light source of a display device being activated, the distribution of the first directional light is formed by a light guide plate (LGP) and an optical film of the display device and the 3D image is formed toward a first direction by a 3D optical element based on the distribution of the first directional light, wherein the 3D optical element is a parallax barrier configured to form a 3D point in time based on directional light being directed toward a slot of the parallax barrier, and wherein the 3D optical element forms the 3D image toward the first direction based on the distribution of the first directional light being directed toward the slot,
wherein, based on a second light source of the display device being activated, the distribution of the second directional light is formed by the light guide plate (LGP) and the optical film of the display device and the 3D image is formed toward a second direction by the 3D optical element based on the distribution of the second directional light, wherein the 3D optical element forms the 3D image toward the second direction based on the distribution of the second directional light being directed toward the slot.

23. The display method of claim 22, wherein the forming of the distribution of first directional light comprises,
activating the first light source arranged at one side of the LGP in a light source device and deactivating the second light source arranged at another side of the LGP.

24. The display method of claim 23, wherein the forming of the distribution of second directional light comprises,
deactivating the first light source and activating the second light source.

25. The display method of claim 22, further comprising:
determining a frame rate to be applied to a display displaying the 3D image based on a result of the detecting the viewers.

26. A device comprising:
a processor; and
a memory including computer readable instructions, which when executed by the processor, cause the processor to,
determine, from a captured image, a number of viewers and associated positions of the viewers with respect to a display,
determine a frame rate for the display based on the number of viewers, and
selectively activate, for each image frame within a plurality of image frames of an image signal, at least a first light source and a second light source based on the associated positions,
wherein, based on the first light source being activated, a distribution of first directional light is formed by a light guide plate (LGP) and an optical film of the device, and a 3D image toward a first direction is formed based on the distribution of the first directional light and a 3D optical element of the device, wherein the 3D optical element is a parallax barrier configured to form a 3D point in time based on directional light being directed toward a slot of the parallax barrier, and wherein the 3D optical element forms the 3D image toward the first direction based on the distribution of the first directional light being directed toward the slot,
wherein, based on the second light source being activated, a distribution of second directional light is formed by the LGP and the optical film, and a 3D image toward a second direction is formed based on the distribution of the second directional light and the 3D optical element, wherein the 3D optical element forms the 3D image toward the second direction based on the distribution of the second directional light being directed toward the slot.

27. The device of claim 26, further including a controller, wherein, based on the controller determining that the number of viewers is greater than 1, the controller is configured to at least one of alternately activate and simultaneously activate the first light source and the second light source for each image frame.

28. The device of claim 26, wherein
the LGP is configured to guide light incident from at least one of the first light source and the second light source to form a distribution of directional light.

29. The device of claim 28, wherein the light guide plate includes optical patterns configured to reflect the light to generate the distribution of directional light.

30. The device of claim 28, wherein
the LGP is configured to guide light incident from at least one of the first light source and the second light source; and
the optical film is configured to form the distribution of directional light by controlling a progress path of light output from the LGP.

* * * * *